W. McDUFFEY.
VEHICLE FENDER.
APPLICATION FILED MAR. 18, 1912.
1,041,318.
Patented Oct. 15, 1912.
2 SHEETS—SHEET 1.
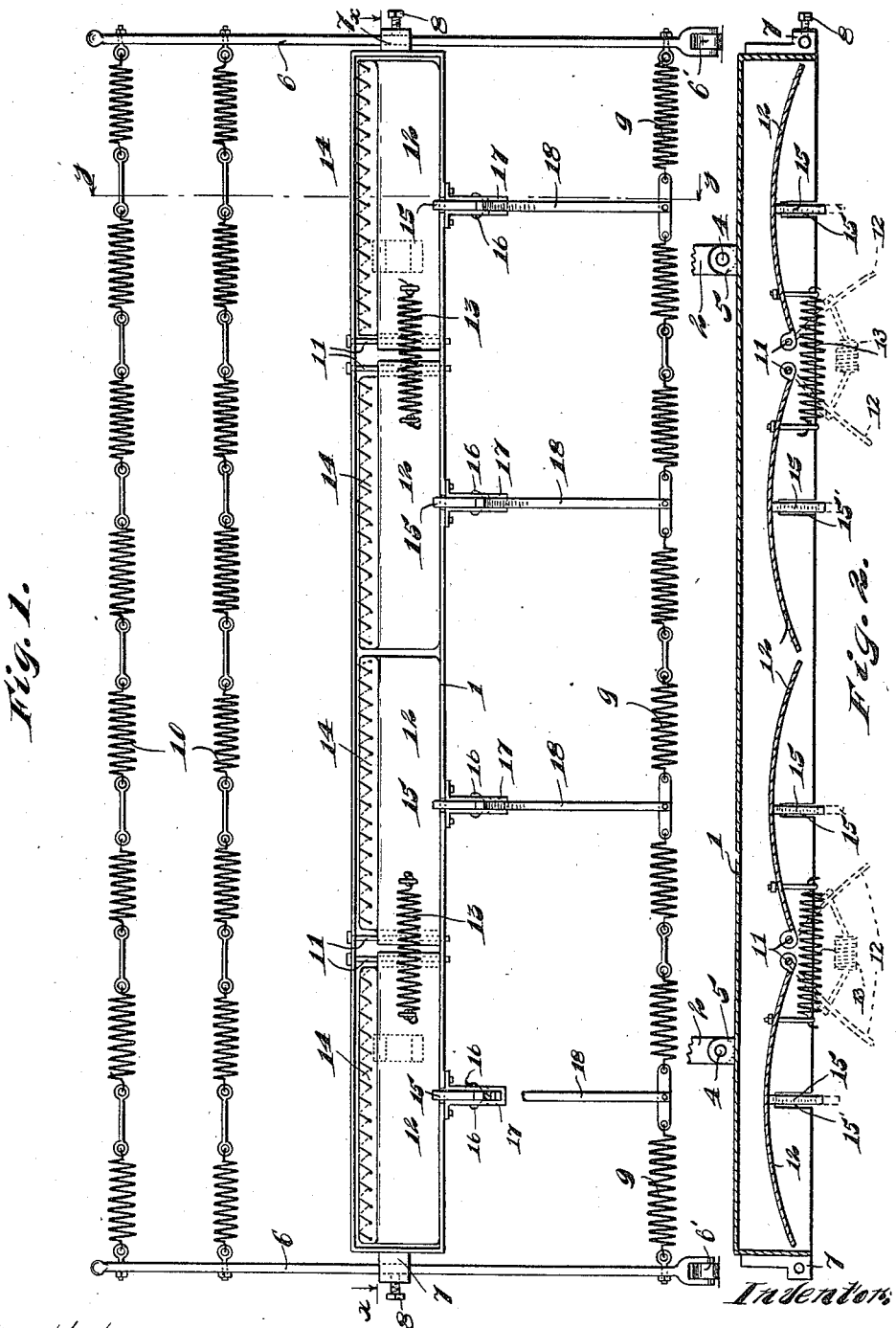
Witnesses:
C. E. Wessels.
A. A. Olson.
Inventor:
William McDuffey,
By Joshua R. H. Potts
his Attorney.

W. McDUFFEY.
VEHICLE FENDER.
APPLICATION FILED MAR. 18, 1912.
1,041,318.
Patented Oct. 15, 1912.
2 SHEETS—SHEET 2.
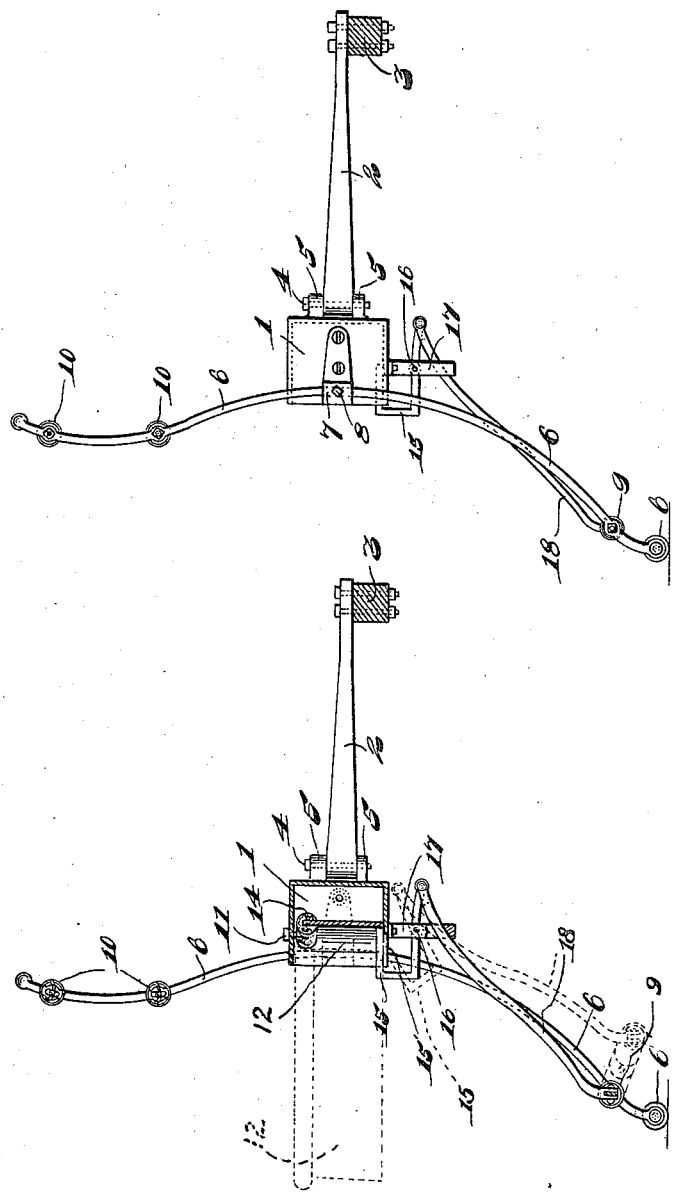
Witnesses:
C. E. Wessels
A. A. Olson
Inventor:
William McDuffey,
By Joshua R. H. Potts
his Attorney.

UNITED STATES PATENT OFFICE.

WILLIAM McDUFFEY, OF CHICAGO, ILLINOIS.

VEHICLE-FENDER.

1,041,318. Specification of Letters Patent. Patented Oct. 15, 1912.

Application filed March 18, 1912. Serial No. 684,503.

*To all whom it may concern:*

Be it known that I, WILLIAM McDUFFEY, a citizen of the United States, and a resident of the city of Chicago, county of Cook, and State of Illinois, have invented certain new and useful Improvements in Vehicle-Fenders, of which the following is a specification.

My invention relates to improvements in vehicle fenders and has for its object the production of a device of this character which will be of improved construction, and efficient in operation.

The invention consists in the combinations and arrangements of parts hereinafter described and claimed.

The invention will be best understood by reference to the accompanying drawings forming a part of this specification, and in which—

Figure 1 is a partial sectional front elevation of a vehicle fender embodying my invention, Fig. 2 is a horizontal section taken on substantially line $x$—$x$ of Fig. 1, the released positions of the movable parts being shown in dotted lines, Fig. 3 is a side elevation of the fender, and Fig. 4 is a vertical transverse section taken on line $y$—$y$ of Fig. 1, the released positions of the movable parts being shown in dotted lines.

The preferred form of construction as illustrated in the drawings comprises a supporting frame which consists of an elongated substantially rectangular hollow frame member 1 which is open at its front side. The frame 1 is supported at the front end of a vehicle by means of arms 2 which are adapted to be connected at their rearward ends with any convenient portion of the vehicle such for instance as the front axle of the vehicle, which is shown at 3. The front ends of the arms 2 are pivotally connected with the respective extremities of the frame member 1 by means of removable pivot pins 4 which pass through alining perforations provided in lugs 5 provided upon said frame member and the forward extremities of said arms. With this arrangement it will be seen that when the frame member 1 is connected with both of the arms 2, the same will be rigidly supported thereby, swinging of said frame member in a horizontal plane in order to gain access to the front end of the vehicle upon which the fender is mounted being permitted upon removal of either one of the pins 4, it being clear that when one of said pins is removed, the fender may be swung upon the other of said pins as a center.

Arranged at the respective extremities of the frame member 1 are substantially vertically extending curved bars 6, the latter being connected with said frame member through the medium of connecting members 7 through which said bars extend, set screws 8 being provided to lock said bars to said member 7, as will be readily understood. Secured to and extending between the lower ends of the bars 6 is an impact member 9 consisting, as shown of a plurality of tension springs, which are connected by links or other suitable connecting elements. The upper ends of the bar 6 are similarly connected by two lines of impact members 10 which are each of a construction similar to that of the member 9, as clearly illustrated, the latter being positioned forward of the members 10 so that, when the fender is in use, the object or person, which is struck thereby will first contact with the impact member 9, contact of the latter with the object or person causing the latter to become unbalanced so that the same will fall against the members 10.

Pivotally secured at 11 within the frame member 1 is a plurality of arms 12 arranged in pairs, as shown. Adjacent coöperating arms 12 are connected by a helical spring 13 which serves to normally hold the free ends of the latter in close proximity or in embracing position as shown in dotted lines in Figs. 2 and 4, and so that, in use, when said arms are released from open position, the same will be instantly swung by said spring to embrace the object or person which is positioned forward thereof or between the same. The arms 12 are curved longitudinally, as clearly shown in Fig. 2, in order to adapt the same to better embrace an object or person, and the upper edges of said arms 12 are provided with upholstering 14 so as to prevent injury to the person which is embraced by the arms.

The arms 12 are releasably held in open position within the frame member 1 by means of detents or levers 15 which are secured at 16 for oscillation in depending substantially U-shaped brackets 17 arranged upon the under side of the frame member 1. The detents 15 are so arranged that when the forward ends thereof are in elevated position, the same will engage against the front sides of the arms 12, as clearly shown in Fig. 4, to hold the same in open position, release of said arms for operative swinging being effected upon depression or downward swinging of said forward ends of said detents. The bottom wall of the frame member 1 is slotted at 15' to permit of this downward swinging of the operative ends of the detents 15. The rearward ends of the detents 15 are connected with the impact member 9 by means of links 18, the construction being such that upon rearward flexing of said impact member, such as is caused by contact thereof with an object or person, said links 18 will be forced rearwardly to cause upward and forward swinging of the rearward extremities of said links (the lower portions of the brackets 17 serving as fulcrums for said links in the swinging of the latter) to cause swinging of the detents 15 to releasing position, as will be readily understood. In the normal position of the impact member 9, the latter will serve to maintain the detents 15 in operative position and so that normally the arms 12 will be held in open position prepared for forward or operative swinging.

In the operation of the fender then, it will be seen that, an object or person which is struck thereby will first contact with the resilient impact member 9. The latter, which contacts with the base or lower end portion of the object or person struck will cause the latter to fall toward the impact members 10, which will yield and thereby absorb any shock and prevent injury to the person. The rearward flexing of the member 9 caused by contact thereof with the object or person will release one or more of the arms 12, as shown in dotted lines in Figs. 2 and 4, which will immediately swing forward to embrace the object or person holding the same in upright position, and thus further serving to prevent injury. In use the lower ends of the arms 6 will contact with the pavement, and to alleviate friction the same are provided with rollers 6'.

A fender of the construction set forth is durable, and economical, and will be found to be highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A vehicle fender comprising a frame; a pair of pivoted arms mounted in said frame for swinging in a horizontal plane and adapted when released to swing forwardly toward each other to embrace the object or person positioned between the same; resilient means for normally holding said arms in embracing position; oscillatory levers for releasably holding said arms in open position; transversely extending impact springs arranged forward of said arms, and an operative connection between said impact springs and said levers whereby flexing of said springs by reason of contact with an object or person effects tilting of said levers to release said arms, substantially as described.

2. A vehicle fender comprising a horizontal transversely extending frame member; a pair of arms pivotally mounted in said frame for swinging in a horizontal plane and adapted when released to swing forwardly toward each other to embrace the object or person positioned between the same; resilient means for normally holding said arms in embracing position; means for releasably holding said arms in open position; vertically extending bars at the respective ends of said frame member; a plurality of transversely extending tension impact springs secured to and extending between said bars; and an operative connection between one of said springs and said arm holding means whereby flexing of said spring by reason of contact with an object or person effects operation of said holding means to release said arm, substantially as described.

3. A vehicle fender comprising a horizontal transversely extending frame member; a pair of arms pivotally mounted in said frame for swinging in a horizontal plane and adapted when released to swing forwardly toward each other to embrace the object or person positioned between the same; resilient means for normally holding said arms in embracing position; oscillatory levers for releasably holding said arms in open position; substantially vertically extending bars at the respective extremities of said frame member; a plurality of transversely extending tension impact springs secured to and extending between said bars; and an operative connection between one of said springs and said arm holding levers whereby flexing of said springs by reason of contact with an object or person effects tilting of said lever to release said arms, substantially as described.

4. A vehicle fender comprising a horizontal transversely extending frame member; means for mounting said frame member at the forward end of a vehicle; a pair of arms pivotally mounted in said frame for swinging in a horizontal plane and adapted when released to swing forwardly toward each other to embrace the object or person positioned between the same; resilient means for normally holding said arms in embracing position; means for releasably holding said arms in open position; vertically extending bars at the respective ends of said frame member; a plurality of transversely extending tension impact springs secured to and extending between said bars; and an operative connection between one of said springs and said arm holding means whereby flexing of said spring by reason of contact with an object or person effects operation of said holding means to release said arms, substantially as described.

In testimony whereof I have signed my name to this specification in the presence of two subscribing witnesses.

WILLIAM McDUFFEY.

Witnesses:
JOSHUA R. H. POTTS,
ARTHUR A. OLSON.

Copies of this patent may be obtained for five cents each, by addressing the "Commissioner of Patents, Washington, D. C."